Nov. 20, 1962  A. WEHNER  3,064,812
PERVIOUS SURFACE

Filed July 26, 1957  6 Sheets-Sheet 1

INVENTOR
ALBERT WEHNER

BY
PATENT AGENT

INVENTOR
ALBERT WEHNER
BY
PATENT AGENT

Nov. 20, 1962 A. WEHNER 3,064,812
PERVIOUS SURFACE
Filed July 26, 1957 6 Sheets-Sheet 4

INVENTOR
ALBERT WEHNER
BY
PATENT AGENT

Nov. 20, 1962   A. WEHNER   3,064,812
PERVIOUS SURFACE
Filed July 26, 1957   6 Sheets-Sheet 5

INVENTOR
ALBERT WEHNER
BY
PATENT AGENT

Nov. 20, 1962

A. WEHNER

3,064,812

PERVIOUS SURFACE

Filed July 26, 1957

INVENTOR
ALBERT WEHNER

BY

PATENT AGENT 3,064,812
PERVIOUS SURFACE
Albert Wehner, 70 Grunring, Herne,
Westphalia, Germany
Filed July 26, 1957, Ser. No. 674,483
Claims priority, application Luxembourg July 28, 1956
23 Claims. (Cl. 209—396)

The invention relates to a pervious surface formed by elements arranged parallel to, and some distance from, one another and provided with lateral projections extending into the interspaces, these elements being alternately assembled in frames, at least one of which, together with the elements contained in it, is movable in relation to the other.

The possibilities for utilizing this principle, which lends itself to a great variety of separating and handling processes, have hitherto been limited to a small number of applications, especially furnace grates, because the known structures of this type were liable to become clogged. The present invention not only overcomes this disadvantage, but achieves fundamental improvements which present entirely new possibilities for the application of these structures.

Briefly stated, such screening apparatus with variable passage rate for the material to be screened comprises two or more plates positioned adjacent one another in parallel relationship. Stub members or projections are mounted on those surfaces of the plates which face a surface of an adjacent plate. The stubs on one plate extend almost to the surface of the adjacent plate, while the stubs on the latter plate interleave the former stubs and extend almost to the former surface. Suitable means are provided to apply a rotary movement to at least one of these plates, whereby opposite stub members pertaining to adjacently positioned plates revolve about each other and sweep substantially around annular spaces between the stubs.

The pervious surface which is the subject of this invention is formed by preferably thin elements or plates arranged parallel to one another, which are provided—in a zone located at some distance below the upper edges of the plates—with one or more rows of stublike projections pointing towards each other and extending almost to the face of the opposite plate; they are so arranged and designed that, when the two frames are moved in relation to each other, the stublike projections of opposite plates rotate round one another whereby their end faces describe annular paths on the plate surfaces opposite them.

Depending on the purpose for which the device is employed, the projections may either revolve continuously or discontinuously around each other, whereby sufficient clearance is provided therebetween and between their end faces and the opposite plates.

The plate elements according to this invention are so designed that, with the size of the openings as determined by the distances between the projections distributed uniformly over the length of the plate in the longitudinal direction and by the length of the projections in the transverse direction, all risk of clogging is eliminated and the ratio of the open and closed portions of the total cross-sectional area is more favorable than in any known screening device of this kind.

If the projections are arranged in several rows one above the other and if, due to gradual wear and tear, an upper row becomes, inoperative, the next row will take over the task of the row above, and the size of the open (unobstructed) cross-sectional area will remain the same even at an advanced stage of wear.

The projections may be so arranged that the paths described by their ends in the course of their movements around one another are merely located side by side or, alternatively, that these paths of the projections about adjacent projections on an adjacent plate overlap in such a way that some zones of the interspaces are each traversed a number of times by different projections. The amount of overlap, if any, should preferably be kept small. Any "dead" areas that may be formed can be avoided by appropriately cutting away the respective parts of the plates, said "dead" areas being areas close to a projection which are not defining the path of another projection sweeping about the first-mentioned projection.

For the same reason it is advisable that the upper and preferably also the lower edges of the individual plates should be cut to a curved shape consisting of a series of circular arcs corresponding to the number of projections spaced at regular intervals along the plates; the centers of these arcs should coincide with the centers of the projections and their maximum radius should be equal to 1½ times the diameter of the projections.

The parts of the plates comprising these circular arcs may, if desired, be made of a material different from that of which the plates themselves are made, e.g., the arc portions may be made of elastic material.

The above-mentioned shape of the upper edges of the plates results in desirable transporting and classifying actions (e.g., if the device is used as a screening unit), because the curved upper edges of the plates, in carrying out their movements relative to the staggered circular arcs of the edges of the opposite plates, to some extent have the effect of transporting particles which are larger than the gap width over the gaps and thus prevent them from entering these gaps. The curved upper edges constitute an enlarged area which reduces the wear of the plate.

It has been found to be especially advantageous to shape the upper edges of the plates in such a way that they provide continuous portions in relation to the annular paths described by the projections, because the material passing across the pervious surface is periodically subjected to a direct transporting action caused by the projections in these continuous portions.

The upper edges of the plates are formed so as to have a contour presenting indentations or recesses which may be of various shapes, e.g., they may be in the form of portions of the annular paths symmetrical or asymmetrical with respect to the axes of the projections punched or cut away, and they may have straight or curved edges.

Adjacent plates may be provided with similar or with differently shaped indentations; furthermore, of two adjacent plates one may have a curved edge with a radius corresponding to the path of the projections (or a larger radius), whereas the other plate may have indentations as described above, so that the shape of the upper edge of the one plate may result in a supplementary transporting action on the material, while that of the other plate has the effect of loosening it up.

It is furthermore conceivable that one and the same plate may, in the longitudinal direction, be provided with different forms of curves and indentations, e.g., one part of the plate may have curved and the next part may have toothed indentations. Similarly indentations or edge shapes of different types may alternate with one another.

The largest permissible recess in the upper edge of one plate adjacent an annular path of a projection secured to an adjacent plate is determined by the requirement that adequate guidance and self-cleaning action of the projections should still be available.

From the viewpoint of economy of material the portions of plate which are situated below the projections may, under certain circumstances, be partly or entirely omitted.

The stublike projections may be given any desired shape, e.g., they may be cylindrical, triangular, polygonal, hemi-spherical, etc. In the event of non-circular shape the apexes or corners must be located on one and the same circle. The projections may consist of bodies inserted into holes drilled in the plates, or bodies fixed to the plates, or—particularly in the case of narrow gaps, i.e., projections of small axial length—they may be formed by raised patterns stamped in the plates themselves.

It may be advantageous to mount the projections on pivots passing through the plates or to insert them—either directly or with ball bearings—in drilled holes in the plates so as to be able to rotate, in which case there is no need to provide any clearance between the paths described by the projections of adjacent plates.

The projections may furthermore have a rough surface, e.g., may be grooved or may be provided with teeth, so that the teeth of the co-operating projections mesh and drive each other. This form of construction assists the self-cleaning action and the crushing of the material treated.

The projections may be made of the same material as the plates or of a different material, e.g., they may be made of a synthetic plastic or of an elastic material such as rubber.

If the projections are cylindrical in shape and a continuous driving motion is applied to one or both of the frames, there will be a periodical shortening and lengthening of the openings formed between the plates. Due to the relative motion of the frames, the length of the openings between adjacent plates in vertical projection will vary alternately on either side of the projections, increasing from a constant minimum value, in accordance with the relationship to be elaborated on below. This minimum value is dependent on the spacing of the projections on one and the same plate and on their diameter.

In a special embodiment of this invention, a bottom row of co-operating projections—self-cleaning and rotating in close contact with one another—may be combined with upper rows of projections having diameters which progressively diminish at higher levels of the plate; these latter projections do not engage one another and they form larger openings at the higher levels, so that in cases where this special embodiment is used as a screening device (for which it is primarily intended) there is a progressive decrease from top to bottom in the size of the screen openings, while at the same time a reducing action is obtained on the material.

Alternatively, the diameters of the projections located one above the other in the several horizontal rows may diminish in the upward direction and at the same time increase in the adjacent vertical rows in such a way that the sum of the diameters or radii of adjacent projections is constant.

In another embodiment, the projections of the plates belonging to one frame unit are all similar, but differ in size from those of the plates belonging to the other frame unit; the motion of the plates in relation to one another then results alternately in the formation of small and large openings.

In this embodiment of the invention, preference may be given to an arrangement whereby the projections on one side of a plate are of larger diameter than those on the other side of that plate, so that in the overall assembly a small-diameter projection of one plate is always located between two large-diameter projections of the adjacent plate.

The operation of the device according to the invention does not require a continuous revolving motion of the projections around one another; if necessary, partial movements can be employed, as in a case where the pervious surface is used as a shut-off device or in a screening device in which full revolutions of the projections are carried out only at intervals for the purpose of cleaning the screen, whereas the screen itself is operated in the usual way, e.g., as a vibrating or resonance screen.

The previous surface designed according to the invention may be either flat, arched or curved in shape or may be arranged in the form of a closed drum of round or polygonal cross-section.

The plates in the device according to the invention may be connected to a source of power or they may be constructed as energy accumulators; they may also be so constructed that heat or electrical energy is generated by the movement of the plates with respect to one another, as will be described in greater detail below.

The numerous possible applications of the pervious surface call for widely varying gap widths between the plates; it may be possible that in one and the same pervious surface a transition from one gap width to another is provided in the direction of transport, or in the transverse direction, so that if the device is used as a screening unit it is possible to proceed from fine to coarse or from coarse to fine screening with a single screening unit or, alternatively, to form bands running down the length of the screen for the purpose of screening the same or different materials with a different width of gap.

It is virtually impossible to give an enumeration of the devices with all conceivable gap widths and special forms of construction that may be employed in certain cases.

A special feature of the invention is the possibility of varying the gap width within wide limits, while retaining all the basic elements of the pervious surface. This is obtained by inserting the plates in grooves of transverse rails which carry them and attach the plates to the frames which are moved in relation to each other. The number of these grooves on the transverse rails corresponds to the smallest gap width and thus to the largest potential number of plates. By installing plates in a larger or smaller number of grooves it is possible to obtain any desired gap width within the range of possibilities presented by the spacing and number of grooves provided. The width of the rails, i.e., the lateral distance between the extreme grooves located on them, is so dimensioned that it corresponds to the common multiple of a number of standard basic divisions.

In the accompanying drawings the invention is illustrated in a number of possible applications and examples of execution.

Figure 1:
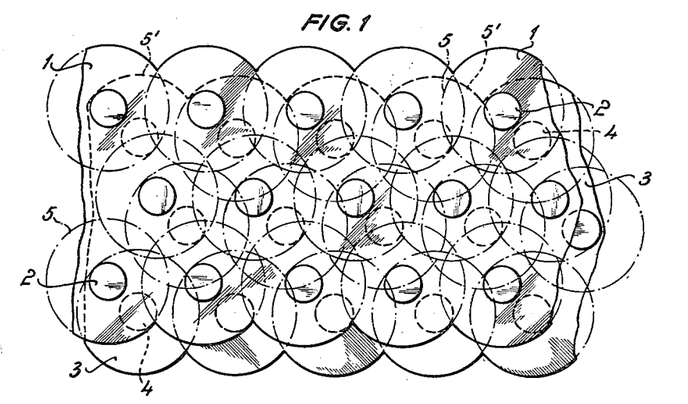
FIGURE 1 illustrates schematically a side view of a screen in accordance with the invention.
Figure 2:
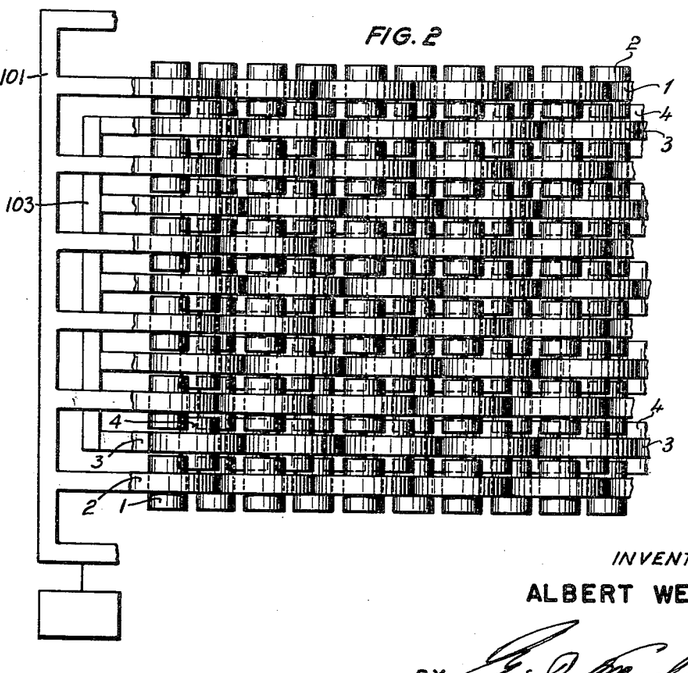
FIGURE 2 illustrates an elevation of the screen shown in FIGURE 1.

FIG. 1 shows the elevation and FIG. 2 shows the plan of a pervious surface designed in accordance with the principle of the invention. It consists of the plates 1, assmbled in a frame 101, and of the plates 3, which are situated between the plates 1 and are assembled in a second frame 103 which can be moved in relation to the first frame 101. At least one of the frames is connected to a suitable moving means, shown schematically at 100, so that there will be a movement of the frames 101 and 103 relative to each other, as described below.

In this example the plates 1 and 3 are provided with three rows of cylindrical projections 2 and 4 arranged at equal distances in the longitudinal direction of the plates. FIG. 1 shows how the projections 2 and 4 revolve in relation to one another as a result of a circular motion imparted to the frames in the plane of the plates, so that the projections describe overlapping paths (defined by the circles 5 and 5') between adjacent plates; in their overall effect they thus sweep the entire space between the plates. In all positions of the projections in relation to one another the clearance which is necessary of their undisturbed movement is, of course, provided.

Figure 3:
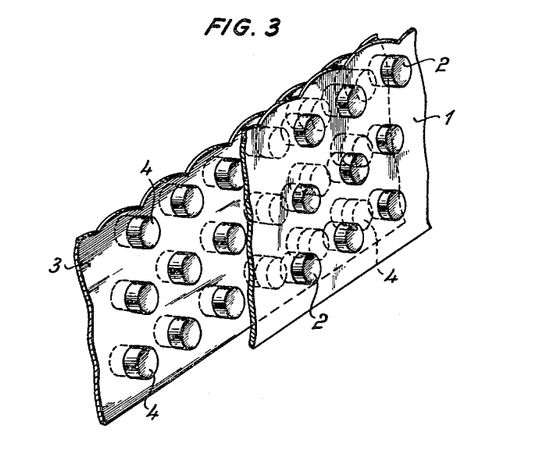
FIGURE 3 shows in a perspective side view a fragment of the screen of FIGURES 1 and 2.

FIG. 3 shows, in perspective, an arrangement for the projections 2 and 4 (which in this case are cylindrical in shape) in rows one above the other and illustrates the thin plates 1 and 3 and the curved upper edges of these plates shaped in the form of arcs concentric with the projections.

The spacing of the projections is chosen to suit the requirements of each individual case, particularly with regard to the purpose for which the pervious surface is to be used. In an extreme case where the pervious surface is to be employed as a shut-off device, the lateral spacing of the projections is so dimensioned that in one position of the projections of adjacent plates the interspaces are completely closed, i.e., the pervious surface has become impervious. In this case, no continuous relative movement of the plates assembled in each of the two frames will be carried out. A movement of appropriate magnitude is performed only when the shut-off device is opened or closed. In order to achieve a good shut-off action, the projections may be made of an elastic material.

The projections may be mounted to rotate about their own axes, and their cylindrical surfaces may be provided with grooves or teeth engaging one another, so that, to some extent, the projections "drive" one another.

Figure 4:
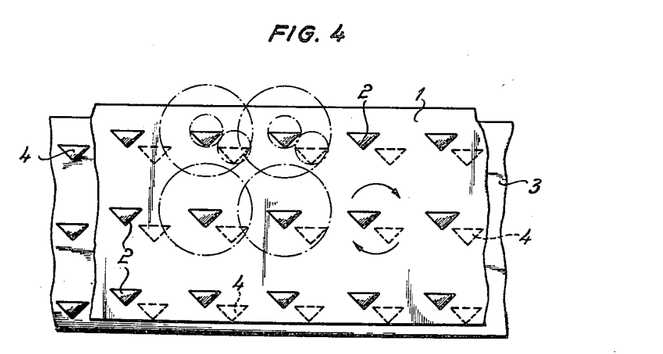
FIGURE 4 shows schematically a side view of another embodiment of a screen according to the present invention.

In the embodiment shown in FIG. 4 the projections 2 and 4 are regular geometric prisms, the corners of which are situated on the same imaginary cylinder. As illustrated, the prisms are of triangular shape, and the imaginary cylinders containing the apices of the projections pertaining to one of the frames revolve about the imaginary cylinders containing the apices of respective projections pertaining to the other of the frames. This form of construction is particularly suited for screening operations in conjunction with a crushing effect on the material, because the projections of prismatic shape act on the material under varying conditions during their revolutions.

FIGS. 5–9 show the mathematical relationships, e.g., for the purpose of obtaining complete temporary shut-off or for obtaining a certain sectional area of flow or a certain degree of closing.

Figures 5, 6, 7:
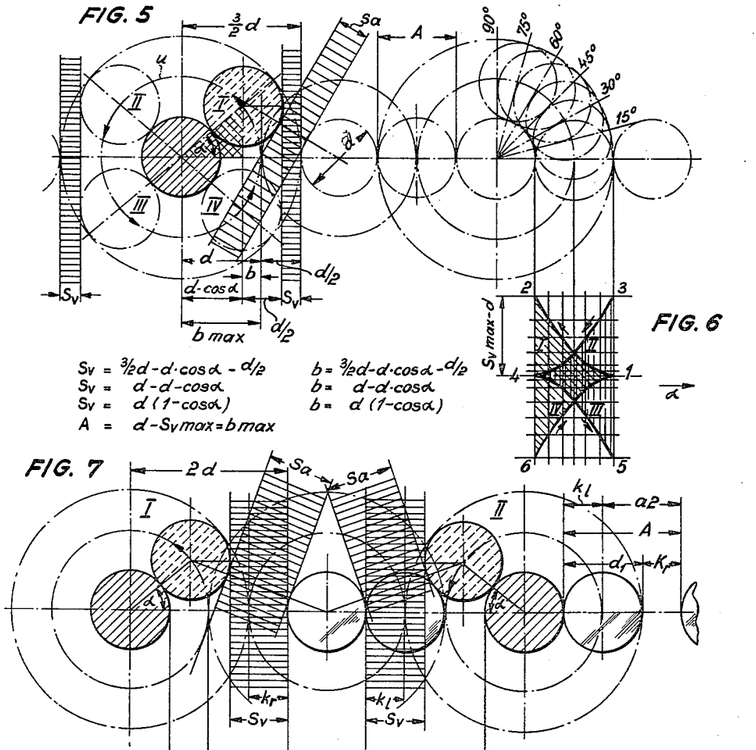
FIGURE 5 illustrates the geometric relationship of the moving parts in the inventive device during its operation.
FIGURE 6 is a diagram derived from the geometric relationship shown in FIGURE 5.
FIGURE 7 illustrates the geometric relationship of the moving parts in another embodiment of the invention.

On the left in FIG. 5 two of the projections are shown operating together in pairs. In the case of multi-stage arrangement these projections are staggered in relation to one another. The circular perimeters of these two projections are in contact with each other in all positions of the projections in the course of their orbital motions; in their overall action they continuously sweep the whole interspace between each adjacent pair of plates.

In the diagram the projection of diameter $d$ which is revolving around the central fixed projection has rotated through an angle $\alpha$ of 40 degrees in the first quadrant. The variable dimension $s_v$ (for the section seen in vertical projection) varies in accordance with the relationship $s_v = d(1 - \cos \alpha)$. In the present case the maximum value of $s_v$ is equal to $d$. The same function is obtained for the height of "$b$" of the arc of the orbital circle "$u$" (indicated by the arrows) of the revolving projections. The absolute length of the variable free opening or area is shown by the dimension $s_a$ in the diagram. The distance between two projections is equal to A, which is equal to the diameter of a projection as well as to the length $d-s_v$ max. and $b$ max.

For these conditions FIG. 6 shows the graphical representation of the functional variation of $s_v$ in the four quadrants.

Numeral 1 indicates the position of a revolving stub when it is to open the passage. In the range of $\alpha=15°$ to $45°$, where $\alpha$ is the angular displacement of the revolving stub (see FIGURE 5), this opening is fairly small, but increases to its maximum for $\alpha=90°$. I, II, III, and IV denote branches of this curve related to the four quadrants in which the revolving stub may be located with respect to the stationary stub (see FIGURE 5). Curves I and IV denote the passage area to the right of the stationary stub, while curves II and III denote the passage area to the left thereof.

Figure 8:
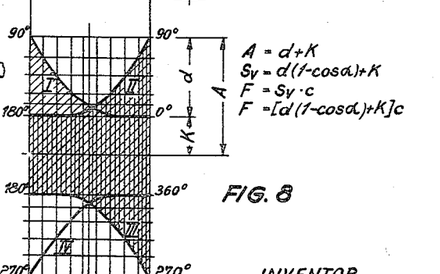
FIGURE 8 shows a diagram derived from the geometric relationship shown in FIGURE 7.

In FIG. 7 the distance between two projections of a plate is greater than $d$. The graphical representation of the function in the various quadrants, shown in FIG. 8, is obtained in the same way as before. The only difference is that there is now, in addition, a constant factor K for the length of the free opening between two plates; K is equal to the difference between A and the diameter $d$; in the course of one revolution, e.g., a counter-clockwise revolution, this factor changes from right to left (as seen in vertical projection). $S_v$ is thus determined by the function: $S_v = d(1-\cos \alpha) + K$.

Figure 9:
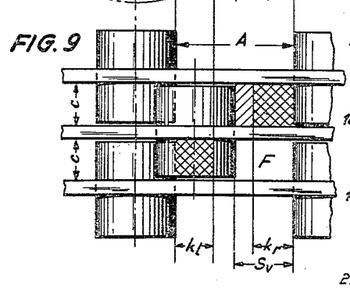
FIGURE 9 illustrates an elevational view of a fragment of a screen according to the invention, the operation of which was theoretically explained with reference to FIGURE 7.

FIG. 9 shows a portion of the pervious surface with the free cross-sectional area (as seen in vertical projection). The area "F" is determined by the relationship: $S_v \cdot c = [d(1-\cos \alpha) + K]c$ (where $c$ denotes the distance between two plates).

For the chosen distance A the constant factor K yields a constant minimum free sectional area to which, during a rotation of the system, is added the variable sectional area determined by the function.

Figure 10:
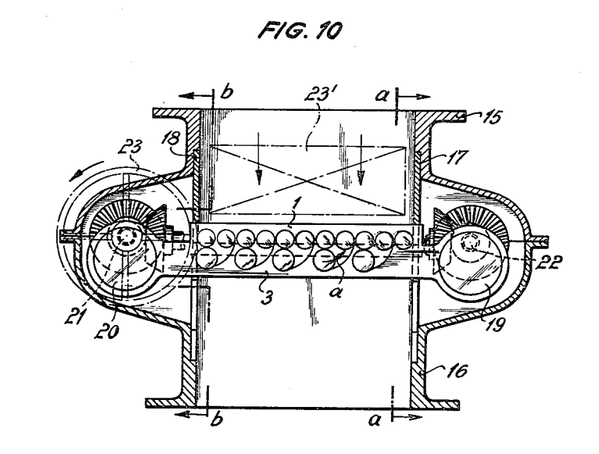
FIGURE 10 illustrates a longitudinal sectional view of a portion of a pipeline for conveying liquid including a screen constructed according to the present invention as a means to shut off the flow of the liquid.
Figure 11:
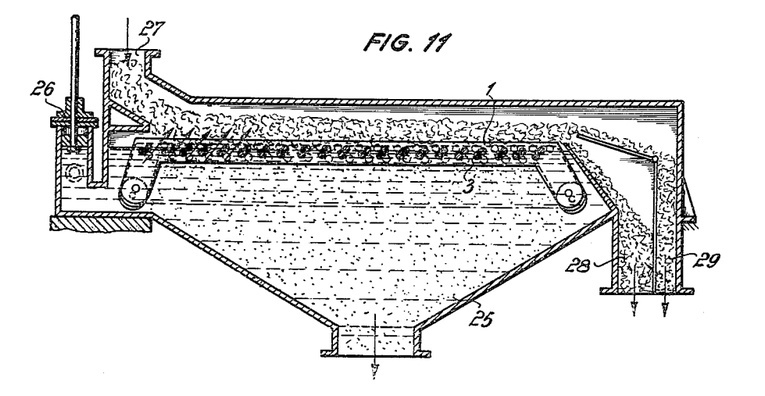
FIGURE 11 shows a cross-sectional view of a washing device for dressing of coal or ore including a screen according to this invention.
Figure 12:
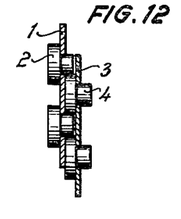
FIGURE 12 represents a cross-section through two plates of a screen of another embodiment according to the invention, said plates having cylindrical projections of of different diameters on the two sides of said plates.
Figure 13:
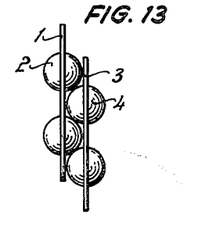
FIGURE 13 illustrates an elevation of the plates similar to FIGURE 12, but having hemispherical projections.
Figure 14:
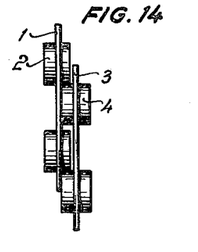
FIGURE 14 shows an elevation of the plates similar to FIGURE 12, but having cylindrical projections of the same diameters and different lengths on the two sides of said plates.
Figure 15:
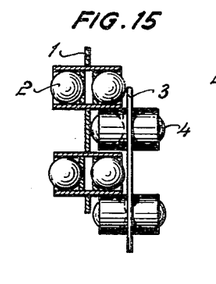
FIGURE 15 illustrates an elevation partially in cross section of the plates, similar to FIGURE 12, but having sleeves as cylindrical projections which contain balls.
Figure 16:
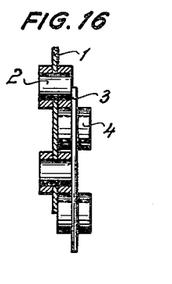
FIGURE 16 shows an elevation, partially in cross section of the plates, similar to FIGURE 15, but without balls in the sleeves.
Figure 17:
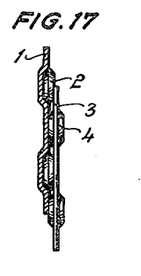
FIGURE 17 illustrates an elevation, partially in cross section of two plates of a screen of a further embodiment according to the present invention, having in one plate indentations of frusto-conical shape holding double frusto-conical bodies, while the other plate is flat and is also provided with projections having the shape of double frusto-conical bodies.
Figure 18:
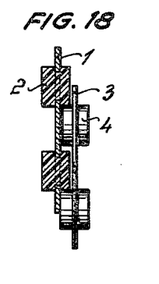
FIGURE 18 shows an elevation, partially in cross-section of two plates, similar to FIGURE 14, having the projections in at least one of the plates made of nonmetallic or plastic material.
Figure 19:
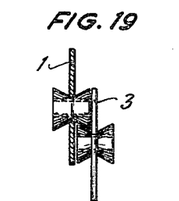
FIGURE 19 represents an elevtaion, partially in cross section of two plates, similar to FIGURE 14, but having projections of conical shape with the bases of the cones forming the free ends of these projections.
Figure 20:
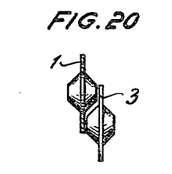
FIGURE 20 shows an elevation, partially in cross section of the two plates, similar to FIGURE 19, but having the bases of said projecting cones secured to said plates.
Figure 21:
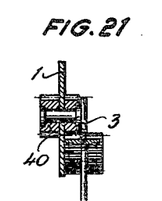
FIGURE 21 illustrates an elevation, partially in cross section of two plates, similar to FIGURE 14, but having gears as cylindrical projections.
Figure 22:
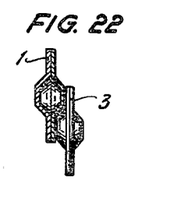
FIGURE 22 shows a plan view, partially in cross section of two plates, similar to FIGURE 20, but having the projections provided as integral portions of the material of the plates.
Figure 23:
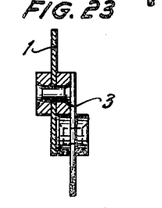
FIGURE 23 represents an elevation, partially in cross section, similar to FIGURE 14, but having the projections attached to the plates by rivets.

FIGS. 10 and 11 show two further embodiments of the invention.

FIG. 10 shows a vertical section through a shut-off device (valve) to be inserted in a pipeline for the conveyance of liquids or gases. By means of this device the sectional area of flow can be completely closed or can be opened to a greater or lesser extent.

The plates 1 assembled in the first of the two frames are rigidly held between connection sockets 15 and 16 in securing plates 17 and 18. The securing plates 17 and 18 serve also for guiding and sealing the plates 3 assembled in the second frame.

As indicated by the arrow, the plate assembly 3 can be swung—by means of a hand wheel—from bottom left to top right, over a greater or lesser distance, so that any desired free sectional area ranging from a maximum value to complete shut-off (i.e., the condition in which the projections of the plates are all at the same level and engage one another) can be obtained.

At their ends the plates 3 are carried on the eccentrics 19 and 20 respectively. The eccentrics are actuated by operating the shafts 21 and 22, which are carried by the casing and are linked by a connecting shaft and bevel gearing, these shafts being rotated by means of the handwheel 23 mounted on one of them.

In this arangement the projections of the one set of plates do not perform continuous circular movements around the projections of the other set of plates, but merely perform partial movements in relation thereto, which movements are imparted to them by turning the handwheel.

When in the partly-open condition the shut-off device constructed in this way at the same time forms a screen which retains any foreign bodies carried along in the medium flowing through the pipeline. The lateral door 23', indicated in FIG. 10, permits the manual removal of matter deposited on the pervious surface.

FIG. 11 shows the possible application of the pervious surface to a washing chamber settling bed for the dressing of coal or ore in a pulsating upward flow of water.

By periodically opening and closing the openings, the two co-operating systems of plates 1 and 3 enable the fluid, pumped into the container 25 by the pump 26, to flow upwards through the settling bed and through the material 27 with a certain rhythm, so as to achieve separation of the material according to its specific gravity (in accordance with the well-known principle of separation).

For this purpose the projections either perform a continuous orbital motion or only a partial motion.

In this arrangement it is also possible, by setting the system of plates in a special position, to control the direction of upward flow of the water and thus to influence the washing process. Further possibilities for regulation are obtained by the shape of the projections, the distance between the plates, and the velocity of the relative movement, as well as by the regulation of the velocity and quantity of water flowing through the device.

FIGS. 12–23 show a number of possible designs for the projections 2 and 4, which have already been discussed in principle and require no further explanation. For the sake of clarity these projections are shown as viewed in the longitudinal direction of the gap formed between the plates 1 and 3, it being noteworthy that in the embodiment of FIGURE 21 the gears constituting the projections are rotatable about their axes.

FIGS. 24–27 show various possibilities for obtaining continuous areas (in relation to the paths described by the projections) in the profile of the upper edges of the plates.

Figure 24:
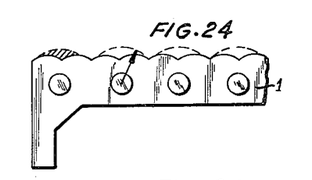
FIGURE 24 is a fragmentary side view of a plate of an embodiment according to the invention, showing the profile of the upper edge of the plate.
Figure 25:
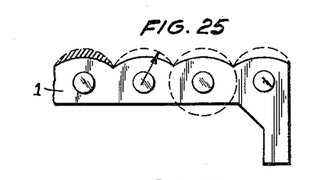
FIGURE 25 illustrates a fragmentary side view, similar to FIGURE 24, but with another profile of the upper edge of the plate.

Referring to FIGS. 24 and 25, showing rounded indentations, the transporting action of the projections is increased: the material is exposed to their direct action practically over the entire pervious surface; this action each time increases from zero to a maximum value and then diminishes back to zero; if the arcs are arranged as shown in FIG. 24, the transporting action is further enhanced inasmuch as the material is each time moved along two "humps" in conjunction with the shoving action obtained in the "valleys" by the projections.

Figure 26:
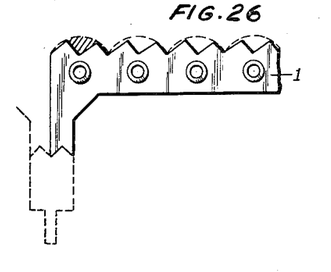
FIGURE 26 shows a fragmentary side view, similar to FIGURE 25, but with a tooth-shaped profile of the upper edge of the plate.
Figure 27:
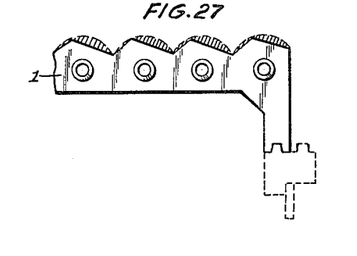
FIGURE 27 illustrates a fragmentary side view, similar to FIGURE 26, but with another tooth-shaped profile of the upper edge of the plate.

Jagged indentations, or indentations with comparatively steep edges, are especially suited in cases where rapid transport is important and no special care in handling the material is necessary. This effect can be further improved by adopting sharper—or tooth-like or knife-like—profiles for the projections.

Figure 28:
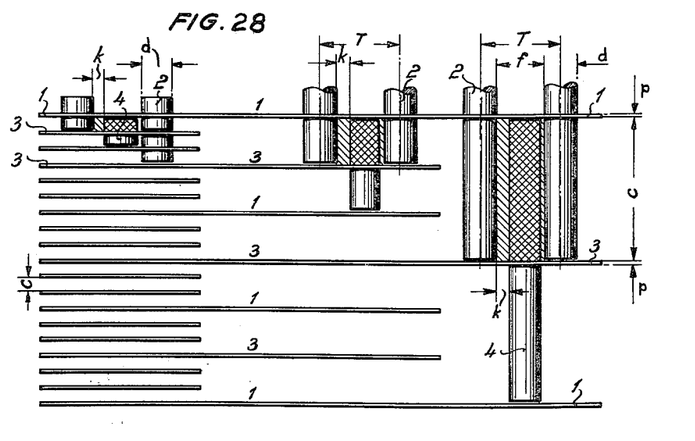
FIGURE 28 shows schematically an elevational view of an embodiment of a screen in accordance with the invention, having stepwise enlarged gaps between the plates.

FIG. 28 shows, in plan view, a screening device with a stepped increase of gap width in conjunction with appropriate modification of the length of the projections 2 and 4 extending up to the adjacent plates attached to the other frame. In this figure, there is indicated the constant value $k$ of the minimum length of the free openings. While in the right-hand portion of the figure this value is much smaller than the gap width, as is desirable for certain types of material, the value $k$ should generally be selected so that it is equal to or larger than $c$, viz., $T=2d+k$, where $d$ is the diameter of a projection and $f$ (the maximum longitudinal distance between two projections 2 or 4) $=d+k$.

Thus the pervious surface has the properties of a screen with square or oblong meshes, while the material passing through the screen is not subjected to pressures and the production of excessive dust is avoided.

The scope of the invention is not limited to the forms of construction described in detail above and represented in the drawings; numerous other arrangements are possible without departing from the basic idea.

I claim:

1. A screen of variable passage rate formed by elements arranged parallel to and spaced from one another and provided with lateral projections extending into the interspaces, these elements being alternately assembled in frames, at least one of which is movable in relation to the other, characterised in that the elements are plates, while the projections form stubs and are located a distance from the edges of the plates and extend almost to the faces of the adjacent plates and means to subject at least one of said frames to movements in relation to each other in such a way that the projections extending into the interspaces between adjacent plates revolve about one another and, thereby describe annular paths on the plate surfaces opposite them.

2. A screen according to claim 1, characterised by the fact that at least the upper edges of the plates are curved in a number of circular arcs corresponding to the number of projections spaced at regular intervals along the plates, the centers of these arcs coinciding with the centers of the projections and their maximum radius being 1½ times the diameter of the projections so that at least the upper edges of the plates lie within the paths described by the projections.

3. A screen according to claim 1, characterised by the fact that the projections are of cylindrical shape and the frames perform relative movements in such a way that the length of the free opening between adjacent plates in vertical projection will elongate and contract alternately on either side in accordance with the relationship $s = d(1 - \cos\alpha)$.

4. A screen according to claim 1, characterised by the fact that each of the projections is a regular geometric prism whose apices are situated on an imaginary cylinder, the imaginary cylinders containing the apices of the projections pertaining to one of said frames revolving about the imaginary cylinders containing the apices of respective projections pertaining to the other of said frames.

5. A screen according to claim 1, characterised by the fact that the projections are hemispherical in shape.

6. A screen according to claim 1, characterised by the fact that the projections are pivoted on their axes and that the co-operating projections of adjacent plates touch each other.

7. A screen according to claim 6, characterised by the fact that the peripheral surfaces of the pivoted projections are roughened and that the co-operating projections mesh with each other and mutually drive each other.

8. A screen according to claim 1, characterised by the fact that the projections of the plates of a frame are all of equal size on one side of a plate, but differ in size from the corresponding opposite projections of the adjacent plate belonging to the other frame.

9. A screen, especially intended for screening and grinding processes, in accordance with claim 1, characterised by the fact that the projections located vertically one above the other in the successive horizontal rows decrease in diameter, whereas the corresponding projections of the adjacent vertical row increase in diameter, in such a manner that, for a constant value of the sum of the two diameters or radii, the maximum length of the openings formed between the projections of each row varies from top to bottom.

10. A screen according to claim 1, characterised by the fact that the upper edges of the plates are provided with continuous portions in relation to the annular paths described by the projections.

11. A screen according to claim 10, characterised by the fact that the continuous portions are formed by flattening the arcs described by the projections.

12. A screen according to claim 10, characterised by the fact that the arcs determined by the paths of the projections are subdivided into two arcs of smaller diameter.

13. A screen according to claim 10, characterised by the fact that the indentations are formed by serrations obtained by cutting away sections of the arcs determined by the paths of the projections.

14. A screen according to claim 10, characterised by the fact that the continuous portions of the upper edges of the plates of one of the frames have a different shape from those of the upper edges of the plates of the other frame.

15. A screen according to claim 10, characterised by the fact that the upper edge of one and the same plate is provided with successive continuous portions of different shapes.

16. A screen according to claim 10, characterised by the fact that the portions of the adjacent plate are completely cut away.

17. A screen according to claim 1, characterised by the fact that part of the areas of the plates corresponding to the paths described by the projections consists of an elastic material.

18. A screen according to claim 1 characterised by the fact that the constant minimum length of the openings formed between the projections is equal to or larger than the gap width.

19. A screen according to claim 1, characterized in that said projections are arranged in at least one row and the projections on adjacent plates have in all positions with respect to each other only a minimum of clearance to permit their free movement.

20. A screen having a variable passage rate for material to pass through said device, at least two parallel plates adjacent one another, stub members mounted on opposite faces of said plates and respectively interposed with respect to one another, and means to apply a rotary movement to at least one of said plates, whereby pairs of respectively opposite and adjacent stub members revolve about each other to sweep substantially around the annular space between said stub members, thereby varying the area for passage between said plates.

21. A screen having a variable passage rate for material to pass through said device, a screen comprising a first series of superimposed spaced plates, a second series of plates alternately interleaved with said first series so that adjacent plates belong to different plate series, first projections secured to said first plates, second projections secured to said second plates and interposed between said first projections, each of said second projections adapted to cooperate with one of the adjacent of said first projections and means to apply a rotary movement to at least one of said series of plates, whereby co-operating pairs of said first and said second projections revolve about each other sweeping substantially around the annular space between said projections, thereby varying the area for passage between said plates.

22. In a screen having a variable passage rate for material to pass through said device, at least two parallel plates opposite one another, first stub members of circular cross section mounted on a face of one of said plates, second stub members of circular cross section mounted on a face of another of said plates, said stub members extending from the plates on which they are mounted almost to the opposite plate faces, and means to rotate each of said first stub members about an opposite of said second stub members, thereby sweeping the annular space around the latter stub members.

23. In a screen having a variable passage rate for material to pass through said device, at least two parallel plates opposite one another, a first row of cylindrical stub members on one of said plates, said members being spaced a distance of at most the stub diameter, a second row of cylindrical stub members on another of said plates, said latter members being spaced a distance of at most the stub diameter, the stub members of said first row being adapted to contact opposite stub members of said second row and being arranged in interleaved relation therewith, all of said stub members substantially extending to opposite faces of opposite plates, and means to apply a rotary motion on said first row to cause each stub member of said first row to revolve about an opposite stub member of said second row.

References Cited in the file of this patent

UNITED STATES PATENTS

| | | |
|---|---|---|
| 147,072 | Slichter | Feb. 3, 1874 |
| 810,922 | Dickey | Jan. 30, 1906 |
| 894,424 | Converse | July 28, 1908 |
| 1,085,997 | Sheridan | Feb. 3, 1914 |
| 1,420,685 | Burch | June 27, 1922 |
| 1,553,693 | Jensen et al. | Sept. 15, 1925 |
| 2,410,017 | Dalin | Oct. 29, 1946 |
| 2,870,910 | Wehner | Jan. 27, 1959 |

FOREIGN PATENTS

| | | |
|---|---|---|
| 523,155 | Belgium | Oct. 15, 1953 |